Figure 1:
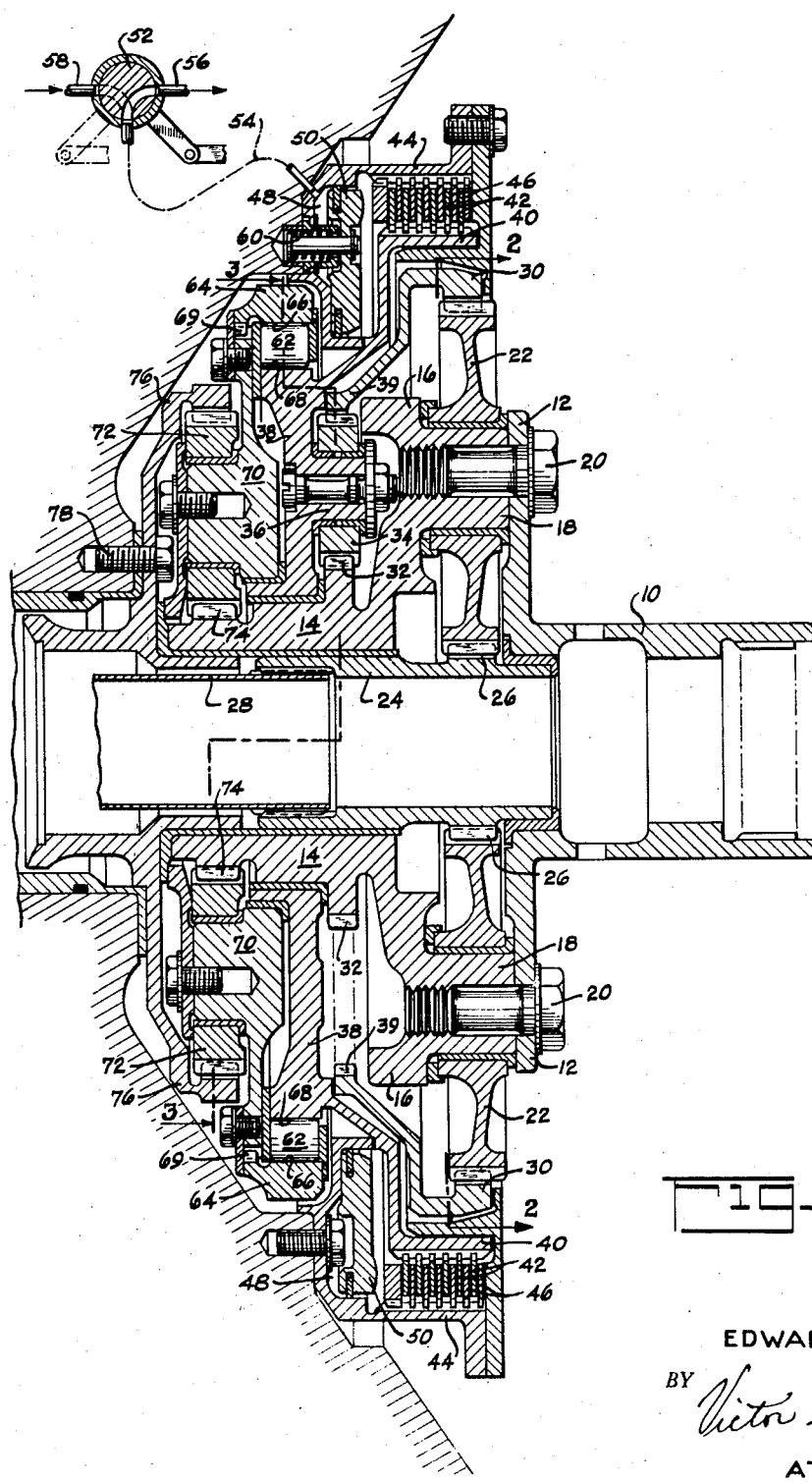

INVENTOR.
EDWARD A. BRASS
BY Victor D. Behn
ATTORNEY

April 15, 1958     E. A. BRASS     2,830,472
TWO SPEED TRANSMISSION SUPERCHARGER DRIVE
Filed June 1, 1955     2 Sheets-Sheet 2

INVENTOR.
EDWARD A. BRASS
BY
ATTORNEY

United States Patent Office 2,830,472
Patented Apr. 15, 1958

2,830,472

TWO SPEED TRANSMISSION SUPERCHARGER DRIVE

Edward A. Brass, Hasbrouck Heights, N. J., assignor to Curtiss-Wright Corporation, a corporation of Delaware Application June 1, 1955, Serial No. 512,431

6 Claims. (Cl. 74—764)

This invention relates to multi-speed transmissions and is particularly directed to an improvement in the transmission disclosed in Patent No. 2,558,738.

An object of the present invention comprises the provision of a multi-speed transmission of the planetary type in which the rotational speed of the planet pinions and internal gears about the transmission axis is relatively low.

Figure 2:
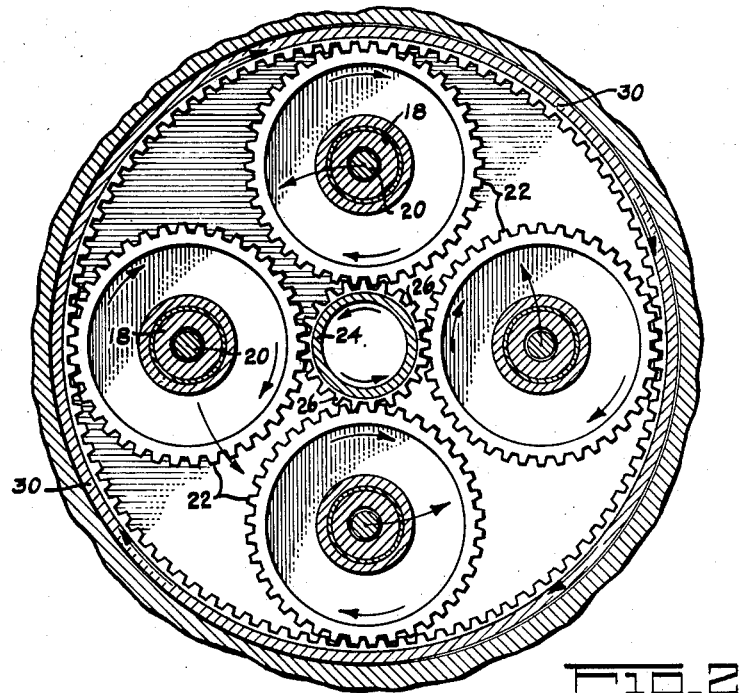
Figure 3:
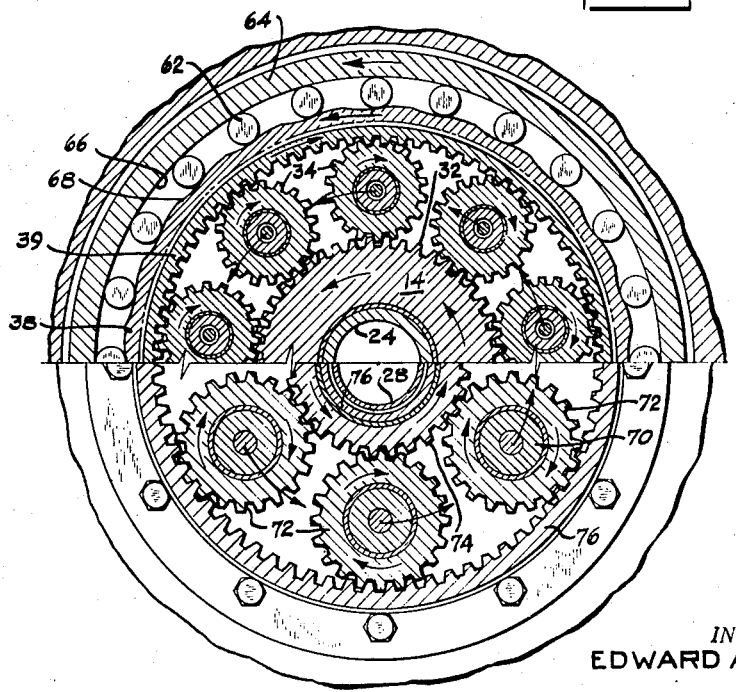

Other objects of the invention will become apparent upon reading the annexed detailed description in connection with the drawing in which:

Fig. 1 is an axial sectional view through a transmission embodying the invention; and Figs. 2 and 3 are sectional views taken along lines 2—2 and 3—3 respectively of Fig. 1.

The invention has been designed for use as a two speed drive for the supercharger of an aircraft internal combustion engine. The invention is described in connection with such use. As will appear, however, the invention is not limited to this use and instead is of general application.

Referring to the drawing, a shaft 10 is arranged to be driven by an engine (not shown), said shaft comprising the transmission input shaft and having an annular flange 12 extending radially outwardly. An intermediate shaft 14 has an annular flange 16 extending radially outwardly and a plurality of circumferentially-spaced bosses 18 extend axially from the flange 16 to the flange 12. The flanges 12 and 16 are drivably connected together by machine screws 20 threaded into the bosses 18 from the flange 12 whereby the shaft 14 constitutes an extension of the shaft 10. A plurality of planet pinions 22 are journaled on the bosses 18 whereby the flanges 12 and 16 constitute a planet pinion carrier member rigid with the shafts 10 and 14.

A shaft 24 has a sun gear 26 rigid therewith and meshing with the planet pinions 22, said shaft being the transmission output shaft and being splined to a shaft 28 for driving the engine supercharger (not shown). An internal ring gear 30 is disposed about and in meshing engagement with the planet pinions 22. Means are provided for driving the internal gear 30 from the shaft 10 in a direction opposite to and at either of two speeds relative to that of said shaft. With this arrangement a two speed step up drive is provided from the input shaft 10 to the output shaft 24, the magnitude of the step up being greater when the internal gear 30 is being driven at the higher of its said two speeds.

For driving the internal gear 30, a sun gear 32 is formed on the intermediate shaft 14, said sun gear meshing with a plurality of planet pinions 34. The pinions 34 are journaled on a plurality of circumferentially-spaced bosses 36 extending axially from a rotatable planet pinion carrier member 38. An annular internal gear 39 is disposed about and meshes with the pinions 34, said internal gear 39 being integral with the internal gear 30. The carrier member 38 is journaled on the shaft 14 and has an axially-extending rim 40. A plurality of friction brake plates 42 are disposed about and are splined to the rim 40. The brake plates 42 are surrounded by an annular fixed housing structure 44 to which a second plurality of friction brake plates 46 are splined. The brake plates 42 and 46 are alternately disposed so that when said plates are clamped together the planet pinion carrier member 38 is held against rotation.

For engaging the brake plates 42 and 46, the housing structure 44 is formed to provide an annular cylinder 48 within which an annular piston 50 is slidably fitted. A valve 52 is connected to the cylinder 48 by a passage 54. With the valve 52 in the position illustrated (Fig. 1) the cylinder 48 is connected to a drain passage 56 whereby, with the valve in this position, the brake plates 42 and 46 are disengaged and the carrier member 38 is free to rotate. When the valve 52 is moved to its dot and dash line position, the cylinder 48 is connected to a liquid pressure supply passage 58 whereupon the piston 50 is moved to the right (Fig. 1) to clamp the plates 42 and 46 together thereby holding the carrier member 38 stationary. Springs 60 are provided for retracting the piston 50 when the valve 52 is moved to its brake disengaged position (as illustrated) in order to prevent the piston 50 from sticking in its brake engaged position.

When the friction brake plates 42 and 46 are clamped together to hold the planet carrier member 38 stationary a drive is provided from the composite input shaft 10, 14 to the internal gear 30 to drive said gear 30 in a direction (clockwise as viewed in Figs. 2 and 3) opposite to that of said composite shaft. As a result a step-up drive is provided from the input shaft to the output shaft 24 through the planet pinions 22. If there is any load on the output shaft when the friction brake plates 42 and 46 are disengaged, said shaft will immediately begin to slow down and therefore the planet carrier member 38 will start to rotate in a counterclockwise direction (Fig. 3) at a speed which increases as the speed of the output shaft 24 falls off.

The speed of rotation of the planet carrier member 38 is limited by a one-way or over-running clutch of conventional construction having rollers 62 which prevents the carrier member 38 from rotating at a speed in excess of the speed of a rotating member 64. The one-way clutch rollers 62 are disposed between an annular internal cylindrical surface 66 on the member 64 and an annular cam construction comprising a series of cam surfaces 68 formed on the planet carrier member 38. Each of the cam surfaces 68 forms a wedge shaped space between it and the adjacent portion of the cylindrical surface 66 within which a roller 62 is disposed. The rotating member 64 is splined at 69 to a planet carrier member 70 for joint rotation with said carrier member. A plurality of circumferentially-spaced planet pinions 72 are journaled on the carrier member and are disposed in meshing engagement with a second sun gear 74 formed on the intermediate shaft 14. An internal gear 76 is disposed about and meshes with the planet pinions 72, said internal gear being secured to the housing as by screws 78. The member 64 is thereby driven from the input shaft at a reduced speed and in a counterclockwise direction as viewed in Fig. 3.

With the aforedescribed construction, when the planet carrier member 38 is held stationary the one-way clutch rollers 62 permit the rotating member 64 to overrun said stationary carrier member. As previously described the planet carrier member 38 is held stationary when the valve 52 is moved to its dot and dash line position to frictional clamp the brake plates 42 and 46 together. With the transmission in this condition, the internal gear 30 is driven in the opposite direction as that of the input shaft 10 whereupon a step-up drive is provided from said input shaft to the output shaft. When the valve 52 is moved to its full line position, the brake plates 42 and 46 are disengaged whereupon the output shaft 24 begins to slow down. As the output shaft 24 slows down the planet carrier member 38 starts to rotate (counter-clockwise as viewed in Fig. 3) at a speed which increases as the speed of the output shaft 24 falls off. When the speed of the planet carrier member 38 reaches that of the rotating member 64 the rollers 62 automatically wedge between the cam surfaces 68 and the cylindrical surface 66 to prevent any further increase in speed of the planet carrier member 38 relative to the input and output shafts. Accordingly a relatively low step-up drive is now provided from the input shaft 10 to the output shaft 24.

In both speed ratios of the transmissions, the speed of rotation of the transmission gears about the axis of the transmission is quite low whereby the centrifugal loads on the bearings are low. With the transmission gears having approximately the relative sizes illustrated and assuming the speed of the input shaft 10 to be unity, the relative magnitudes of the speeds of rotation of the various gears and planet carriers at each of the two speed ratios are approximately as follows:

|  | High Speed Ratio | Low Speed Ratio |
| --- | --- | --- |
| Planet carrier 12, 16 | +1.0 | +1.0 |
| Planet carrier 38 | +0 | +0.3 |
| Planet carrier 70 | +0.3 | +0.3 |
| Sun gear 26 | +8.6 | +6.5 |
| Sun gear 32 | +1.0 | +1.0 |
| Sun gear 74 | +1.0 | +1.0 |
| Planet pinions 22 | −3.0 | −1.8 |
| Planet pinions 34 | −2.5 | −1.5 |
| Planet pinions 72 | −0.7 | −0.7 |
| Internal gear 30 | −0.5 | −0.1 |
| Internal gear 39 | −0.5 | −0.1 |
| Internal gear 76 | 0 | 0 |

In the above tabulation the positive sign indicates a counterclockwise direction of rotation and the negative sign a clockwise direction of rotation as viewed in Figs. 2 and 3. Also it should be noted that the speed of rotation of the planet pinions is expressed relative to their respective planet carriers.

As is apparent from the above tabulation, with the exception of the output sun gear 26, the rotative speeds of the various gears are quite low in both speed ratios. Attention is particularly called to the fact that none of the planet carriers or internal gears has a rotative speed in excess of that of the low speed shaft 10. Also the relative rotative speed of the friction brake plates 42 and 46 just prior to their engagement is only 0.3 of the speed of the input shaft 10. This low relative speed of the friction brake plates minimizes scuffing and wear of these plates. The one-way clutch rollers 62 also only rotate at 0.3 of the speed of the shaft 10 whereby said rollers engage with little shock. It should also be noted that with the pinions 22 having a diameter substantially larger than that of the output gear 26, as illustrated in the drawing, the rotative speed of said pinions 22 about their respective axes is substantially less than that of the output gear 26, as is shown in the above tabulation. This is very important from the standpoint of the life of the bearings of said pinions.

In a transmission having a rotating restraining element, such as the transmission of the present invention with its one-way roller clutch 62, there inherently is a recirculating horsepower within the transmission. With the present invention this recirculating horsepower is not superimposed on the main path of external power transmitted from the transmission input shaft 10 to the output shaft 24 so that no element of the transmission is loaded with more than this external power.

With the aforedescribed transmission construction a large range of possible speed ratios is available in a limited space because the speed ratio of the input and output shafts is quite sensitive to changes in the rotative speed of the planet carrier 38.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A multi-speed transmission comprising an input shaft; an output shaft; a first planetary gear train including planet gear means carried by one of said shafts, a first gear drivably connected to the other of said shafts and meshing with said planet gear means, and a second gear meshing with said planet gear means; a second planetary gear train including a third gear drivably connected to said one shaft, a rotatable member, second planet gear means carried by said rotatable member and meshing with said third gear, and a fourth gear meshing with said second planet gear means and drivably connected with said second gear; brake means engageable to prevent rotation of said rotatable member and disengageable to permit rotation of said rotatable member; and means engageable with said rotatable member for constraining said rotatable member to rotation at a predetermined speed relative to that of said input shaft after disengagement of said brake means.

2. A multi-speed transmission comprising an input shaft; an output shaft; a first planetary gear train including planet gear means carried by one of said shafts, a first gear drivably connected to the other of said shafts and meshing with said planet gear means, and a second gear meshing with said planet gear means; a second planetary gear train including a third gear drivably connected to said one shaft, a first rotatable member, second planet gear means carried by said rotatable member and meshing with said third gear, and a fourth gear meshing with said second planet gear means and drivably connected with said second gear; brake means engageable to prevent rotation of said rotatable member and disengageable to permit rotation of said rotatable member; a second rotatable member, gear means drivably connecting said second rotatable member to said one shaft; and means including a clutch means engageable with said first rotatable member for operatively connecting said first and second rotatable members for rotation at the same speed after disengagement of said brake means.

3. A multi-speed transmission comprising an input shaft; an output shaft; a first planetary gear train including a plurality of planet pinions carried by one of said shafts, a sun gear drivably connected to the other of said shafts and meshing with said pinions, and an internal gear disposed about and meshing with said pinions; a second planetary gear train including a second sun gear drivably connected to said one shaft, a rotatable member, a second plurality of planet pinions carried by said member and meshing with said second sun gear, and a second internal gear disposed about and meshing with said second plurality of planet pinions and drivably connected to said first internal gear; brake means engageable to prevent rotation of said rotatable member and disengageable to permit rotation of said rotatable member; and means including clutch means engageable with said rotatable member for constraining said rotatable member to rotation at a predetermined speed relative to that of said input shaft after disengagement of said brake means.

4. A multi-speed transmission comprising an input shaft; an output shaft; a first planetary gear train including a plurality of planet pinions carried by said input shaft, a sun gear drivably connected to the other of said shafts and meshing with said pinions, and an internal gear disposed about and mashing with said pinions; a second planetary gear train including a second sun gear drivably connected to said input shaft, a first rotatable member, a second plurality of planet pinions carried by said member and meshing with said second sun gear, and a second internal gear disposed about and meshing with said second plurality of planet pinions and drivably connected to said first internal gear; brake means engageable to prevent rotation of said rotatable member and disengageable to permit rotation of said rotatable member; a second rotatable member; gear means drivably connecting said second rotatable member to said input shaft; and means including one-way clutch means engageable for operatively connecting said first and second rotatable members at the same speed after disengagement of said brake means.

5. A multi-speed transmission comprising an input shaft; an output shaft; a first planetary gear train including a plurality of planet pinions carried by one of said shafts, a first sun gear drivably connected to the other of said shafts and meshing with said pinions, and an internal gear disposed about and meshing with said pinions; a second planetary gear train including a second sun gear drivably connected to said one shaft, a first rotatable member, a second plurality of planet pinions carried by said member and meshing with said second sun gear, and a second internal gear disposed about and meshing with said second plurality of planet pinions and drivably connected to said first internal gear; brake means engageable to prevent rotation of said first rotatable member and disengageable to permit rotation of said rotatable member; a third planetary gear train including a third sun gear drivably connected to said one shaft, a second rotatable member, a third plurality of planet pinions carried by said second rotatable member and meshing with said third sun gear, and a third internal gear disposed about and meshing with said third plurality of planet pinions; means for securing said third internal gear against rotation; and clutch means engageable for constraining said first rotatable member to rotation at the speed of said second rotatable member after disengagement of said brake means.

6. A transmission as recited in claim 5 in which said one shaft is said input shaft, said clutch comprises an automatically engageable one-way clutch and the diameter of each of the planet pinions of said first planetary gear train is substantially larger than that of said first sun gear.

References Cited in the file of this patent

UNITED STATES PATENTS

| | | |
|---|---|---|
| 2,263,159 | Berger | Nov. 18, 1941 |
| 2,301,072 | Nardone | Nov. 3, 1942 |
| 2,544,543 | Porter | Mar. 6, 1951 |
| 2,558,738 | Davis et al. | July 3, 1951 |